July 3, 1956      S. GERSHBERG      2,752,780
APPARATUS FOR TESTING ADHESIVE TAPE
Original Filed June 20, 1952      3 Sheets-Sheet 1
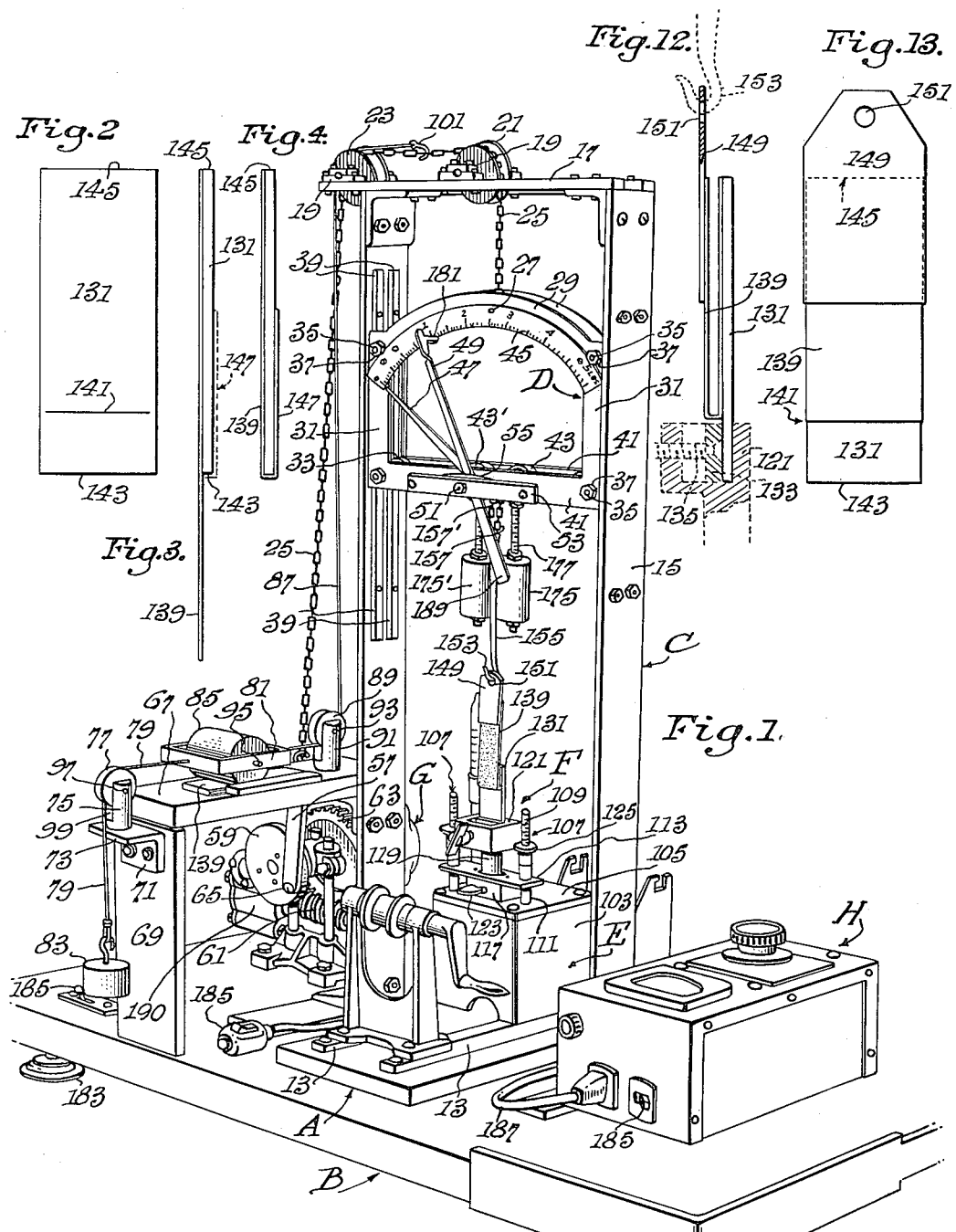
INVENTOR.
SOLOMON GERSHBERG
BY
ATTORNEYS July 3, 1956 S. GERSHBERG 2,752,780
APPARATUS FOR TESTING ADHESIVE TAPE
Original Filed June 20, 1952 3 Sheets-Sheet 2

INVENTOR.
SOLOMON GERSHBERG
BY
ATTORNEYS

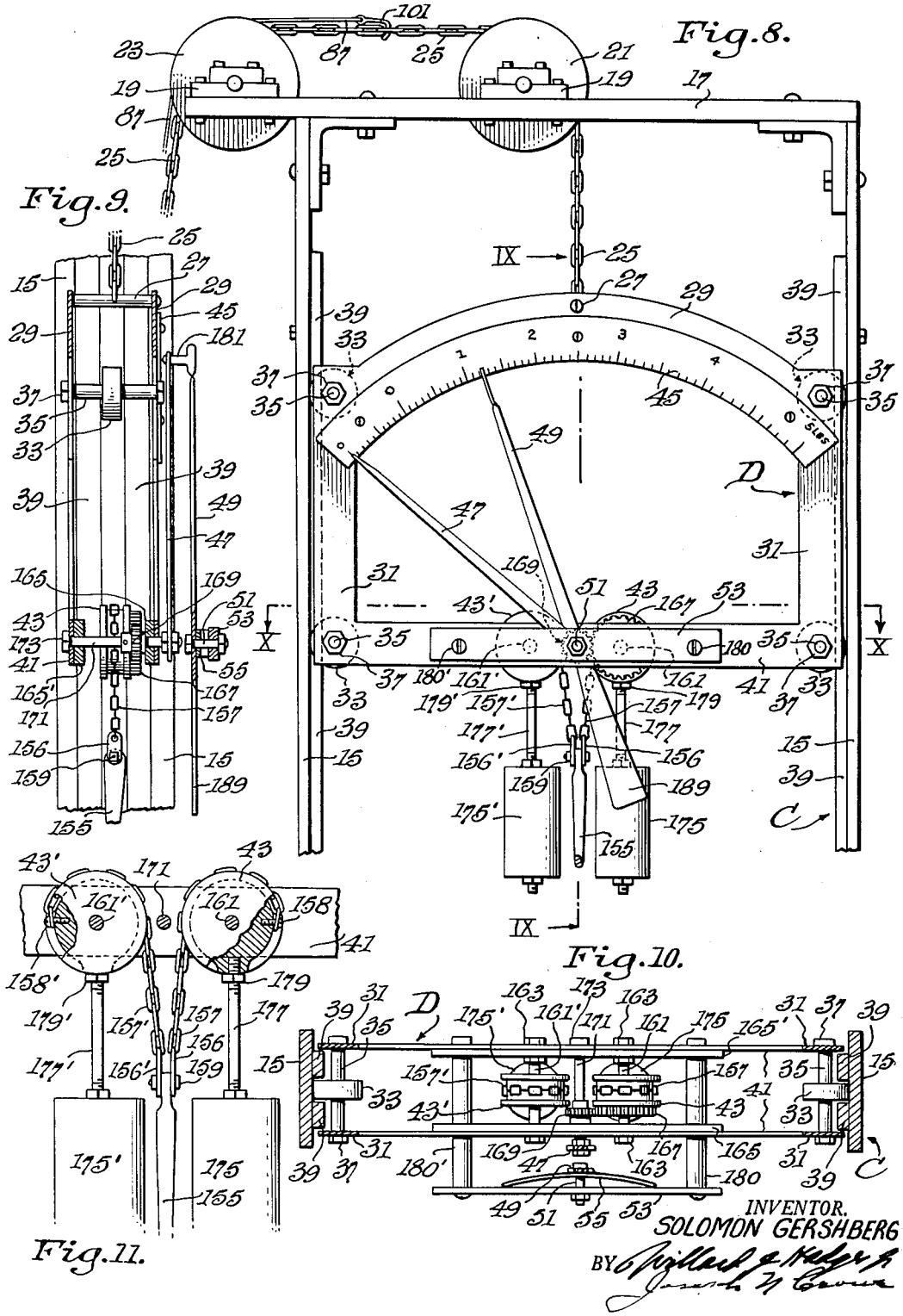

United States Patent Office 2,752,780
Patented July 3, 1956

2,752,780

APPARATUS FOR TESTING ADHESIVE TAPE

Solomon Gershberg, New York, N. Y.

Original application June 20, 1952, Serial No. 294,762. Divided and this application June 20, 1952, Serial No. 294,763

2 Claims. (Cl. 73—150)

(Granted under Title 35, U. S. Code (1952), sec. 266)

The invention described herein may be manufactured and used by or for the Government for governmental purposes, without payment to me of any royalty thereon.

The present invention provides improved apparatus for testing the adhesiveness of adhesively coated materials such as adhesive tapes generally which may be coated with either thermoplastic or normally tacky, pressure responsive adhesive compositions, but more particularly the latter, such including adhesive surgical tapes and other various adhesive items used in first aid and major or minor surgical treatments.

This application is filed as a division of my co-pending application, Serial No. 294,762, filed June 20, 1952.

Heretofore, procedures for testing plaster adhesives have been open to objections due to inconsistent results and the absence of definite evaluation of adhesiveness. Thus, in accordance with prior procedures, it is found that test specimens almost invariably break before they pull loose from the testing equipment due to the fact that the total adhesive force produced by the specified area of attachment of test specimens exceeds the tensile strength of the adhesively coated cloth, the adhesive qualities of the specimens becoming indeterminable under such conditions. Furthermore, specification requirements for adhesiveness actually are arbitrary and inconclusive, there being many instances where test specimens, although fully conforming to the specification requirements, fail to give satisfactory results when applied to the skin.

In accordance with the present invention, there is provided an improved testing apparatus for determining the adhesiveness of adhesive tape which will produce reproducible and accurate results enabling ready and accurate determinations of relative adhesive qualities of samples of tapes manufactured by various producers; and the improved apparatus provided by the present development enables a quantitative determination of any change in adhesiveness of a given sample due to aging, storage, and other deteriorating factors. In employing the present improved equipment, all operations are performed mechanically, hence they are not subject to variations inherent in an operator.

Further objects and advantages of the present invention will become apparent as the description proceeds and the features of novelty will be pointed out in particularity in the appended claims.

The invention will be understood more readily by reference to the accompanying drawings in which:

Fig. 1 is a perspective view of one form of equipment constructed in accordance with the present invention, the view showing this equipment in operation for testing the amount of adhesiveness of a specimen of adhesively-coated tape;

Fig. 2 is a front elevation of a specimen-mounting panel for a test specimen to be tested on the equipment of Fig. 1;

Figs. 3 and 4 are successive side elevations showing the manner of applying a test specimen to the specimen mounting of Fig. 2;

Fig. 8 is an enlarged fragmentary front elevation of the upper part of the apparatus of Fig. 1, showing details of a reciprocating scale frame forming a part of the apparatus;

Fig. 9 is a detailed vertical sectional view taken on the line IX—IX of Fig. 8, looking in the direction of the arrows;

Fig. 10 is a horizontal sectional view taken on the line X—X of Fig. 8, looking in the direction of the arrows;

Fig. 11 is an enlarged fragmentary side view, partially in section, of pointer-actuating weight-controlled sheaves, shown, for example, in Figs. 1 and 8.

Fig. 12 is a side elevation of the specimen-mounting assembly employed in Fig. 1, showing details of the assembly and specimen in testing positions; and Fig. 13 is a front elevation of the parts shown in Fig. 12.

Figure 5:
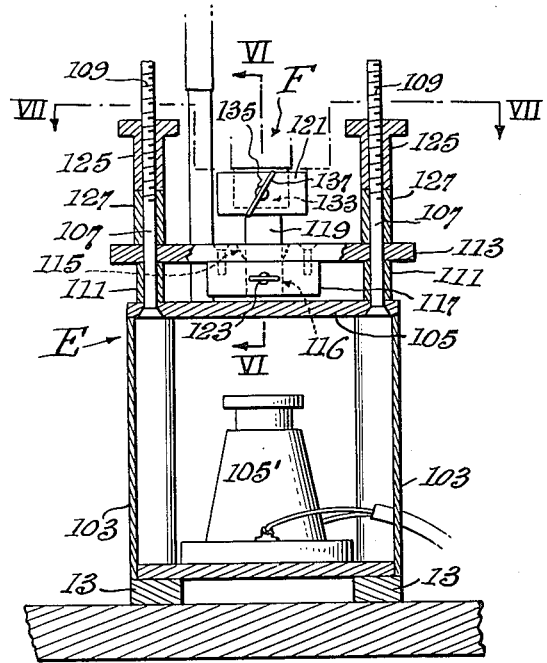
Fig. 5 is a detail vertical section of the specimen-mounting assembly employed in Fig. 1, the view showing details of the assembly and specimen in testing position.
Figure 6:
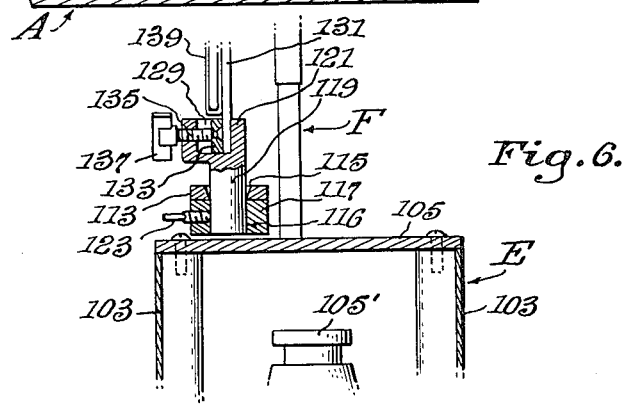
Fig. 6 is a vertical sectional view of a specimen clamp and associated parts, the view being taken on the line VI—VI of Fig. 5, looking in the direction of the arrows.
Figure 7:
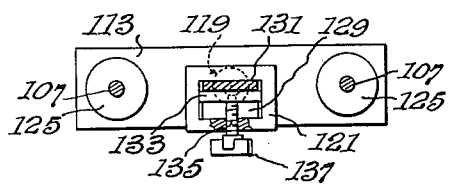
Fig. 7 is a horizontal sectional view of the parts of Figs. 5 and 6 taken on the line VII—VII of Fig. 5, looking in the direction of the arrows.

Referring more particularly to the drawings, the improved testing apparatus comprises a mounting panel A on which the apparatus is mounted, the panel A and certain associated parts as will be identified hereinafter, being mounted on a table B which is maintained level in both horizontal and transverse directions by suitable leveling means which will be defined hereinafter in greater detail. A vertical frame C slidingly mounts a scale frame or carriage D for vertical reciprocation relative thereto. The improved apparatus also includes a testing table E upon which is mounted clamping instrumentality F for the specimen to be tested. The testing table E has a planar solid top and houses suitable heating means for suitably warming the test specimens to a desired extent. An actuating motor G is mounted on the table B for reciprocably operating the scale frame D, and a control rheostat H together with suitable control switches also are provided.

In more detail, the panel A is provided with parallel side bars 13 to which are secured the vertical frame beams 15 of the frame C. These beams 15 are joined at their upper ends with a pair of spaced horizontal frame members or bars 17 which carry bearing blocks 19 in which top pulley sheaves 21 and 23 are rotatably mounted, a flexible chain cable 25 passing over and around the sheaves 21 and 23, with the free end of the cable 25 secured to a spacer pin 27 positioned at the center point between complementary arcuate top frame members 29 of the scale frame D. The frame D also comprises spaced side members 31 which carry rollers 33 mounted on axles 35 that are anchored by nuts 37, there being one of these rollers at each corner of the frame D. These rollers operate in vertical, spaced, parallel guide tracks 39 mounted on the inner surfaces of the vertical frame beams 15. The scale frame D is completed by complemental, spaced, horizontally disposed bottom bars 41 between which are mounted a pair of pulley sheaves 43, 43′, which will be referred to in greater detail hereinafter. The forward arcuate frame member 29 of the scale frame D carries an arcuate scale 45 concentric with the said frame member 29, the scale 45 being graduated in units of weight and fractions thereof, either pounds or fractions thereof, or kilos and fractions thereof. A scale pointer 47 is provided for indicating the loads impressed on the scale frame, and an independently mounted stop pointer 49, which is turable on axle 51 that extends through a supplemental bar 53 carried on the forward bottom bar 41 and spaced therefrom, the stop pointer 49 being controlled by a leaf spring 55. These elements also will be referred to hereinafter in greater detail.

The suspension cable 25 for the scale frame D passes over and around the top pulley sheaves 21 and 23 as aforesaid, and is connected to a vertically reciprocable actuating arm 57 which is eccentrically mounted on a disc 59. A motor G drives a worm 61 through a gear box 190. The worm 61 in turn drives a worm gear 63 which is mounted on a common shaft with the disc 59. The arm 57 is pivoted at its lower end by a pivot pin 65 and produces a simple harmonic, vertically reciprocating movement to the flexible cable 25 and the scale frame D.

A roller table 67 is provided, which table has a planar top, a vertical leg 69 of which table has an angle bracket 71 secured thereto, the horizontal portion 73 of this bracket mounting a recessed bearing block 75 in which is mounted a pulley sheave 77 over which passes a flexible cable 79, one end of which is secured to a reciprocating roller frame or yoke 81, the other end of which cable 79 is attached to a counterweight 83 which is suspended freely by the cable 79. A roller 85 is rotatably mounted in the yoke 81, this roller being of known weight. The forward end of the yoke 81 has secured thereto a flexible cable 87 which passes under and around a pulley sheave 89 which is mounted in a forward bearing bushing or bracket 91 and is turnable therein on its axle 93. The roller 85 turns on its axle 95 mounted in the side members of the yoke 81, and the pulley sheave 77 rotates on its axle 97 mounted in the recessed end 99 of the bearing block 75. A similar recess in the forward bearing bracket 91 accommodates the forward sheave 89. The flexible cable 87 also passes over and around the top pulley sheave 23 and is connected to the flexible suspension cable 25 for the scale frame D between the top sheaves 21 and 23, as is indicated at 101, whereby the scale frame D, as it vertically reciprocates responsively to the actuation of the eccentric arm 57, horizontally reciprocates the roller yoke 85, the counterweight 83 pulling this yoke 85 backwardly as the scale frame D rises, while the downward movement of the scale frame pulls the roller yoke 85 forwardly against the action of the counterweight 83, the roller 85 therefore being rolled backwards and forwards on the top 67 of the roller table. This roller table conveniently is mounted on the main table B, for ready access.

The testing table E actually is a hollow box having sides 103 and a top 105, in which is housed an electric heater 105' of a suitable type. Extending vertically from this top 105 and secured therein are bolts 107, the shanks of which are threaded part ways along as indicated at 109. Sleeves 111 enclose the lower ends of the bolts 107 and receive a guide plate 113 having holes therethrough for the reception of these bolts 107. The plate 113 also has a centrally disposed hole 115 therethrough which registers with a similar opening 116 of a guide and securing collar 117 for the reception of a shank portion 119 of a specimen clamping device 121, a thumb screw 123 being provided to lock the shank portion 119 of the clamp in this locking collar. The guide plate 113 is secured in place by means of knurled locking nuts 125 on the bolts 107. These locking nuts 125 bear against sleeves 127 which enclose the bolts 107 and are interposed between the locking nuts 125 and the guide plate 113. This guide plate 113 and the securing collar 117 are adapted to receive the shank 119 of the specimen-clamping means. As has been mentioned above, the clamping device comprises, in addition to the shank 119 and head 121, a recess 129 in the head which opens upwardly for receiving a specimen-carrying panel 131 which will be referred to in more detail hereinafter. Positioned in the recess 129 is a movable clamping element 133 that is mounted permanently on the inner end of locking thumb screw 135, which is actuated by thumb pressure on the wings 137, tightening of which clamps the movable element 133 against the specimen retaining panel 131. All of the aforesaid parts 113 through 137 may be made conveniently of an aldehyde-type condensation resin, such as "Bakelite."

There are prepared a suitable number of test specimens, for instance ten, for accurately averaging the results of the determinations as finally made, one of these specimens being indicated at 139 (see Figs. 2, 3, 4, 12 and 13). These specimens are of the same dimensions, for example, 4 inches long and one inch wide. Each specimen is applied lengthways to a "Bakelite" panel 131 having a scribe line 141 thereon spaced a half-inch from the end 143 of the panel 131. The panel 131 is of known dimensions which are somewhat smaller than the dimensions of the test specimens. For example, using a test specimen 4 inches long by one inch in width, the panel 131 may be 2½ inches long, $^{59}/_{64}$ inch wide, and $^{1}/_{16}$ inch thick. The test specimen 139 is applied lengthways of the panel with the adhesive surface of the specimen coincident with the top edge 145 of the panel 131 when the test is being run. The free end of the specimen is folded around the opposite (bottom) end 143 and applied to the other flat side of the panel as is indicated at 147 on Fig. 3. The panel 131 and the strip thus applied is placed on the top 67 of the roller table, and is rolled twice by roller 85 which roller is of known weight, for instance 1.78 pounds, and the speed of the roller as it reciprocates is a constant known speed, for example 12 inches per minute. The temperature of the specimen is adjusted to 37°–39° C. for twenty minutes.

It has been stated that the scribe line 141 of each of the test panels 131 is at the same distance (½ inch) from the end 143 of each panel. After the temperature of each specimen is adjusted as stated above, the folded portion 147 of the specimen is peeled off from the rear flat surface of its panel and is pressed firmly onto a 1 by 1 inch area of an aluminum tab 149, the peeling of the specimen being continued until the scribe line 141 is just exposed, thus exposing a ½ inch length of the panel 131 from the end 143 thereof.

The aluminum tab 149 has a hole 151 through its upper end adapted to receive a suspension hook 153 referred to hereinafter and which has a long suspension shank portion 155, the hook 153 being suspended from flexible cables 157, 157' which are attached to the upper end of the shank portion 155 through an attaching bolt 159 which passes through an eye provided therefor in the upper end of the shank 155 and also passes through registering holes in connecting links 156, 156'. This will be referred to in greater detail hereinafter.

The half-inch length of panel 131 which has been exposed as has been described above, is inserted and clamped in the clamping head 121 by manipulation of the clamping screw head 137 and the clamping screw 135, the shank 119 of the clamp being inserted and clamped in the guide plate 113 and clamping collar 117. When the panel 131 with the test specimen 139 thereon is firmly clamped, the hole 151 is placed over the hook 153, thus retaining the tab 149 and the panel 131 in vertical position.

As has been mentioned above, the scale frame D is reciprocable vertically between the guide tracks 39, and comprises arcuate spaced top frame beams 29, the forward beam of which carries the scale 45 which is concentric with respect to the arcuate top frame beams 29. The suspension chain 25 is secured to the spacing bolt 27 placed centrally relative to the top frame members 29, the attachment being between the front and rear of these frame members. The vertical lateral frame elements 31 mount the lower transverse frame members 41, movement of the entire frame D being accomplished responsively to shortening and lengthening the cable 25 responsively to the simple harmonic motion of the eccentric arm 57.

Mounted between the bottom transverse frame elements 41 are the complemental pulley sheaves 43, 43' which have been referred to above, over which suspension cables 157, 157' are passed in opposite directions, these cables being attached to the respective pulley sheaves at diametrically opposite points by screws or the like 158, 158'. The sheave 43 is turnably mounted on its axle shaft 161 and the pulley sheave 43' is mounted on its axle shaft 161'. Through the arrangement of the sheaves 43, 43' relative to the flexible cables 157, 157', the sheaves when in operation will turn in opposite directions. The axle shafts 161, 161' extend through the bottom transverse frame members 41 and are secured in place by lock nuts 163. The bottom transverse frame members 41 may be reenforced by stiffening bars 165, 165' through which the axle shafts 161, 161' pass.

Mounted on the axle shaft 161 and in front of the pulley sheave 43 and contiguous thereto, is a gear 167 which meshes with a pinion 169 on a shaft 171 which is intermediate the sheaves 43, 43' and which is retained suitably by nuts or the like 173. This axle shaft 171 carries the scale pointer 47, which moves over the scale 45 and is positioned coincidentaly with the center of the axis of the arcuate frame members 29 and of the scale 45. Turning of this axle shaft 171 moves the scale pointer 47 as will be apparent.

It will be seen also that each of the pulley sheaves 43, 43' is provided with a pendulum-type counterweight 175, 175', which counterweights are of the same size and weight values and depend from the respective pulley sheaves 43, 43' through stem elements 177, 177' that also are of equal length and diameter, these stems 177, 177' being threaded into the respective sheaves and secured by lock nuts 179, 179'. These counterweights 175, 175' assure equal tension on each of the suspension cables 157, 157' and act to return the scale pointer to its starting position relative to the scale 45 after each determination.

Spacer bolts 180, 180' hold the bar 53 suitably spaced forwardly of the bottom front transverse member 41 of the scale frame. As has been mentioned above, an axle shaft 51 is carried centrally by bar 53, this axle 51 carrying the stop pointer 49 which has a rearwardly extending abutment 181 which is engaged by the scale pointer 47 and is carried therewith to the end of the forward movement of the scale pointer 47, thereby indicating the end reading of the scale pointer after the latter returns to its starting position, the stop pointer being movable independently of the scale pointer, and is retained accurately in the end position of movement of the scale pointer by the spring 55. The stop pointer is returned manually to a position below the expected point of indication on the scale 45 so that on the next determination, the scale pointer will encounter the abutment 181, for repeating the movement.

From the foregoing description it will be seen that the testing equipment herein described determines adhesiveness of the tape by measuring the force required to strip a test specimen of adhesive tape from a "Bakelite" panel of known dimensions, to which panel the test specimen has been applied under known standard conditions. This panel, as has been indicated above, is somewhat smaller in size than the test specimen. This panel, with the specimen carried thereby as has been mentioned above, is secured for the test in vertical position and the actuating arm 57 on the rotating disc 59 is at its uppermost position. The motor G is started and the scale frame D is lifted along with the aluminum tab 149 which has been suspended from the hook 153. The specimen is peeled off the panel by the upward movement of the scale frame D, the adhesiveness between the specimen and the panel causing a pull on the hook 153 which is in excess of the weight of the counterweights 175, 175', the equal values of which assure equal pulls being applied to the suspension cables 157, 157', thus maintaining the hook shank 155 in equilibrium between the pulley sheaves. The sheave 43 turns counter-clockwise during the specimen stripping, while the sheave 43' turns clockwise. The resulting pull on the hook 153 and the opposite rotation of the sheaves 43 and 43' separate the counterweights 175, 175' and move the scale pointer 47 along the scale 45 from its zero position on the scale to an indication on the scale corresponding to the total pull required for complete separation of the panel and the test specimen. As the scale pointer moves along the scale 45, it picks up the stop pointer 49, carrying the latter along with it to the maximum reading of the scale pointer on the scale which corresponds to complete separation of the test strip from the panel. When the test strip is pulled completely from the panel, the tension on hook 153 is released and the counterweights 175, 175' then are free to return the sheaves 43, 43' to their starting position and the scale pointer 47 is returned to its zero reading, the stop pointer 49 remaining placed at the high reading on the scale corresponding to the high point of the scale pointer. The stop pointer 49 then is turned manually to a position where it again will be picked up by the scale pointer during the next determination.

From the foregoing description, it will be seen that all results obtained by this equipment are expressed in terms of pounds representing the force necessary to strip the specimen from the panel. The results are reproducible, and the tests are not affected by the size of the specimen or the tensile strength of the tape cloth. All operations are performed mechanically, and therefore are not subject to variations inherent in the operator. All specimens are subjected to known constant conditions. A tab 149, which may be made of aluminum or other suitable material, is preferred to other means, such as clamps, for holding the specimen during the test for the following reasons:

The stripping (peeling off) force is applied to the specimen on the panel in its perpendicular position parallel to its surface. Under these conditions, the portion of the test specimen on the tab 149 is held by a shear force while the portion on the panel is being stripped off. This shear force is considerably greater than the stripping force, hence there is no possibility of the specimen being stripped off the tab.

The dimensions of the panels 131 are not critical, but need to be constant for all panels. The value $59/64$ inch stated above for the width of the panels is merely to indicate that for a specimen one inch wide, the panel may be $59/64$ inch, that is, somewhat narrower than the width of the specimen, although specifically this may be variable from this value, although, as stated, all panels (ten, where there are ten specimens to be tested) are to be the same. Thus, for one inch wide specimens, the panels may be $15/16$ inch wide, while for specimens less than one inch wide, panels about $1/32$ inch narrower than the corresponding width of the specimen may be used. The purpose of applying the free end of the specimen to the opposite side of the panel is to facilitate the proper handling of the specimen in the rolling and temperature adjustment procedures.

Screws 183 permit leveling the table B. Suitable control switches 185 are provided for controlling the actuation of the motor G and a rheostat H which receive current from a suitable current supply not shown, through cable 187. The lower portion 189 of the stop pointer 49 is substantially larger than the upper portion which includes the pointer, so that the stop pointer is equally balanced for ease of operation, it being understood that after each scale reading the stop pointer is adjusted manually for the next engagement of the scale pointer 47 with abutment 181.

From the foregoing description and consideration of the improvements presented by the present invention, and the illustrative embodiments thereof set forth in the foregoing description and shown in the accompanying drawings, it will be apparent that various structural details may be changed and modified without departing from the inventive concept, and accordingly it will be understood that it is intended and desired to embrace within the scope of the invention such modifications and changes as may be necessary or desirable to adapt the invention to various conditions and use, as defined by the appended claims.

Having thus described my invention, what I claim as new and wish to secure by Letters Patent is:

1. Apparatus for testing adhesiveness of adhesively coated tapes or strips, which comprises in combination, a testing table, a testing frame vertically mounted on the testing table, a carriage mounted for reciprocating motion longitudinally of said frame, scale means mounted on said carriage, suspension means attached to said carriage, power-actuated mechanism operably connected to said carriage for effecting vertical reciprocation of the said carriage relative to the frame, clamping means on the testing table beneath the scale for vertically clamping a specimen-mounting panel having a test specimen of the tape uniformly adhering thereto, said suspension means engaging the specimen and stripping the same from the panel by a vertically applied stripping pull exerted on the specimen by the carriage during upward vertical movement thereof, and pointer means for said scale including actuating mechanism for the pointer means operated by resistance of the specimen against pulling thereof away from the panel under the vertically applied pulling force produced by upward vertical movement of the carriage.

2. Apparatus for testing adhesiveness of adhesively coated tapes or strips, which comprises in combination, a testing table, a testing frame vertically mounted on the testing table, a carriage slidably mounted in the testing frame for vertical reciprocatory movement relative thereto, a flexible suspension cable connected to the carriage, power-actuated means connected to the suspension cable for effecting vertical reciprocation of the said suspension cable and carriage relative to the frame, clamping means on the testing table including vertically apertured guide and holding means for test specimen retaining devices, a clamp including a shank portion and a clamping head portion including a movable clamping element, the said shank portion being removably received in the apertured guide and holding means, a test panel vertically secured in the clamping head portion and having a test specimen of adhesive strip adhered thereto, means for vertically holding a definite portion of the test specimen, means suspended from the carriage secured to the said vertical holding means for exerting a vertically directed stripping pull on the test specimen for vertically pulling the test specimen from the test panel until complete separation is effected, a scale mounted on said carriage, pointer means operative over the scale for indicating amount of pull exerted by the test specimen in resisting the separation from the panel, and means actuated by the pull of the test specimen for operating the pointer means, thereby measuring amounts of force required for the separation of the specimen from the panel.

References Cited in the file of this patent

UNITED STATES PATENTS

| | | |
|---|---|---|
| 1,991,854 | Johansson | Feb. 19, 1935 |
| 2,051,464 | Bradner et al. | Aug. 18, 1936 |
| 2,406,989 | Bonner et al. | Sept. 3, 1946 |
| 2,473,517 | Freedman | June 21, 1949 |
| 2,604,783 | Herrlinger | July 29, 1952 |